United States Patent [19]

Sakai et al.

[11] Patent Number: 5,377,342
[45] Date of Patent: Dec. 27, 1994

[54] METHOD OF CONTROLLING A DUPLEX DATA STORAGE SYSTEM AND DATA PROCESSING SYSTEM USING THE SAME

[75] Inventors: Masanori Sakai; Toshihiko Kai; Osamu Akiba, all of Numazu, Japan

[73] Assignee: Fujitsu, Ltd., Kawasaki, Japan

[21] Appl. No.: 715,580

[22] Filed: Jun. 14, 1991

[30] Foreign Application Priority Data

Jun. 14, 1990 [JP] Japan .................... 2-155807

[51] Int. Cl.$^5$ .................. G06F 12/00; G06F 12/16; G06F 13/00
[52] U.S. Cl. ...................... 395/425; 364/238.3; 364/268; 364/268.3; 364/DIG. 1; 364/239.7; 364/285.1; 395/575
[58] Field of Search .............. 395/425, 575; 364/200 MS File, 900 MS File, 268, 268.3

[56] References Cited

U.S. PATENT DOCUMENTS

| | | | |
|---|---|---|---|
| 4,916,605 | 4/1990 | Beardsley et al. | 395/425 |
| 4,922,456 | 5/1990 | Naddor et al. | 365/185 |
| 5,014,187 | 5/1991 | Debize et al. | 395/425 |
| 5,159,671 | 10/1992 | Iwami | 395/250 |
| 5,239,637 | 8/1993 | Davis et al. | 395/425 |
| 5,239,646 | 8/1993 | Kimura | 395/575 |

FOREIGN PATENT DOCUMENTS 0116344  8/1984  European Pat. Off. .
0279912  8/1988  European Pat. Off. .

Primary Examiner—Joseph L. Dixon
Assistant Examiner—Frank J. Asta
Attorney, Agent, or Firm—Staas & Halsey

[57] ABSTRACT

A processor module generates a data write request and sends data specified thereby to each of two data buffers respectively provided in two data storage units, each having a data storage device, such as a magnetic disc device. When the data has been completely written into each of the data buffers, a write completion response is sent back to the processor module from each of the data storage units. When the processor module has received the write completion responses from the data storage units, it recognizes that the data write request has been completed.

13 Claims, 17 Drawing Sheets

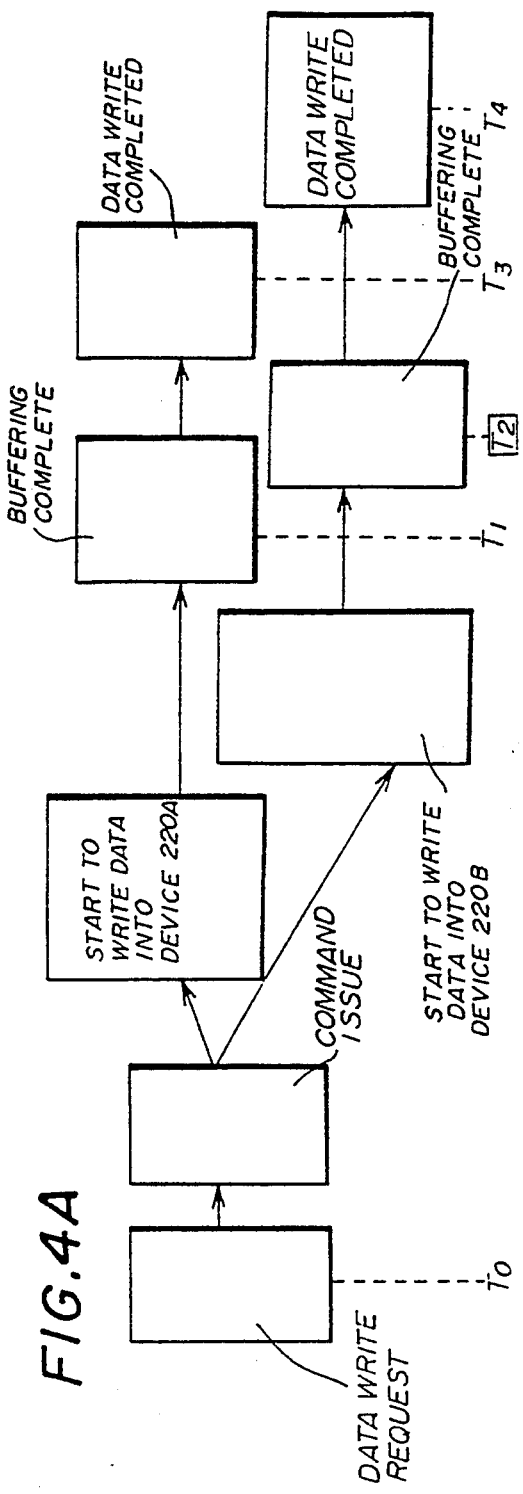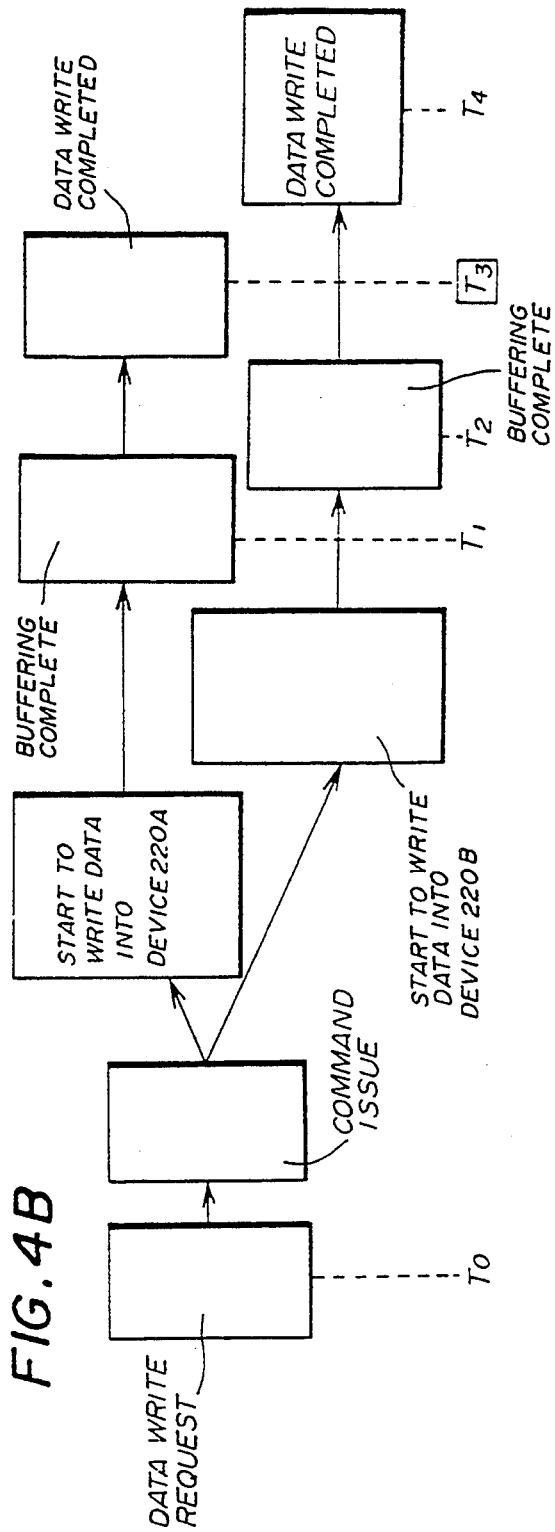

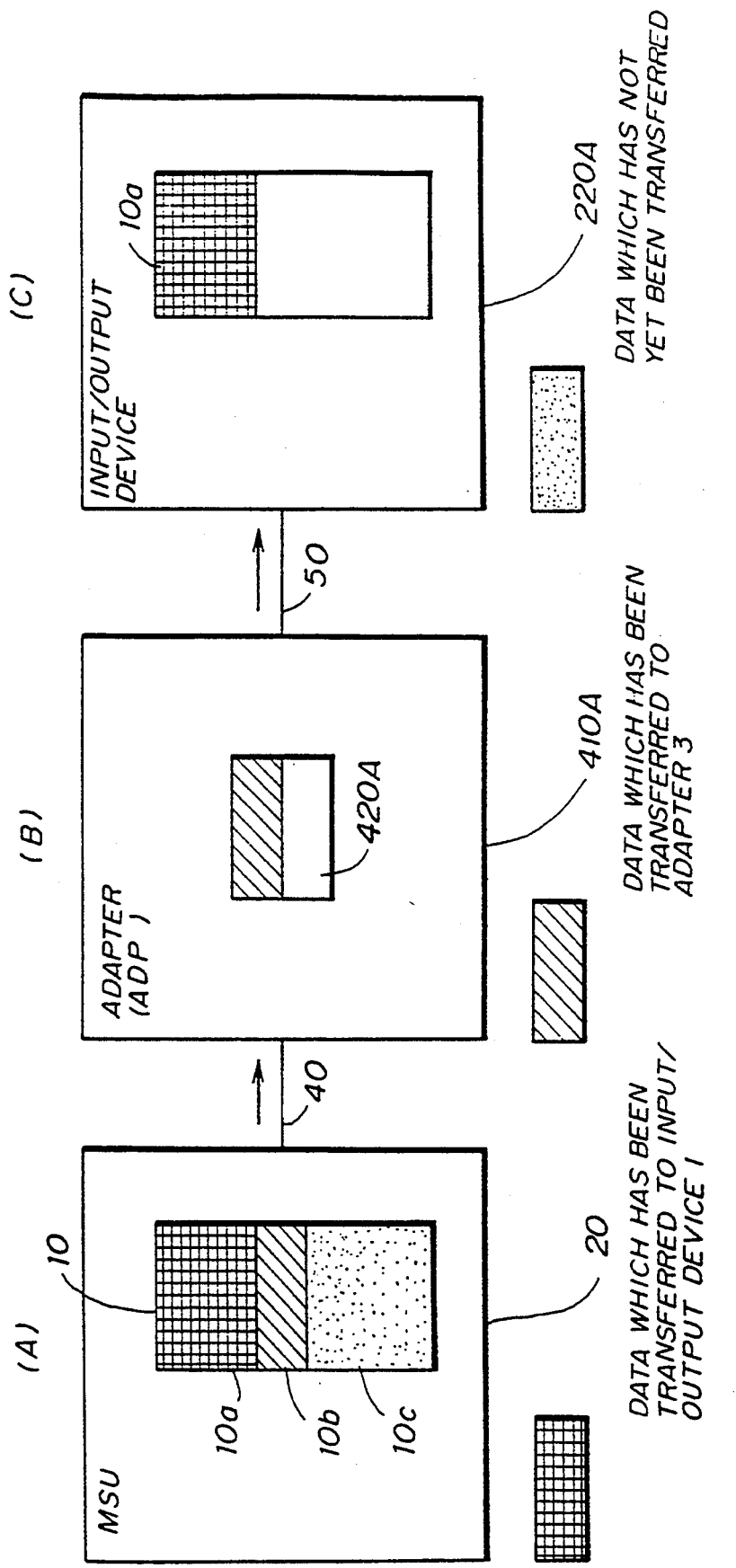

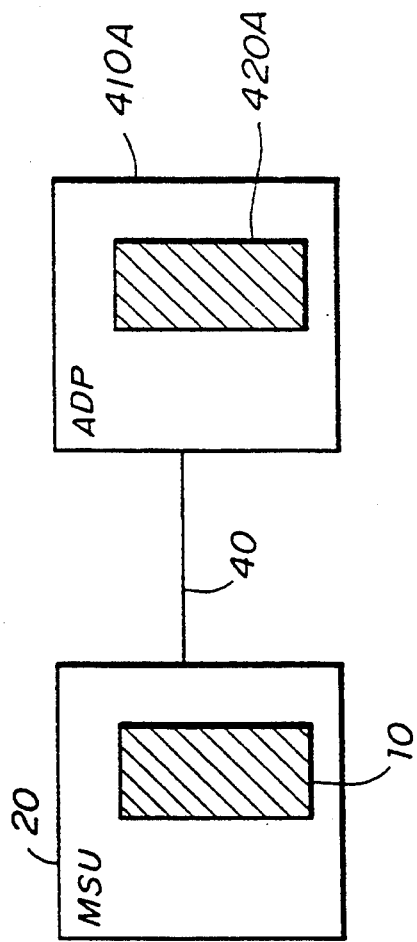
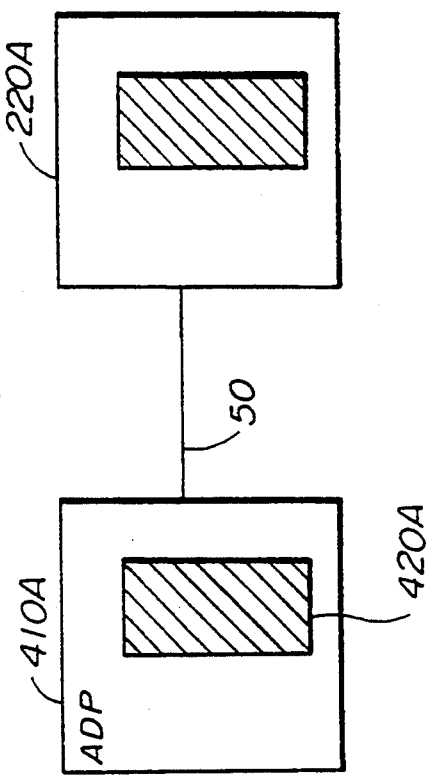

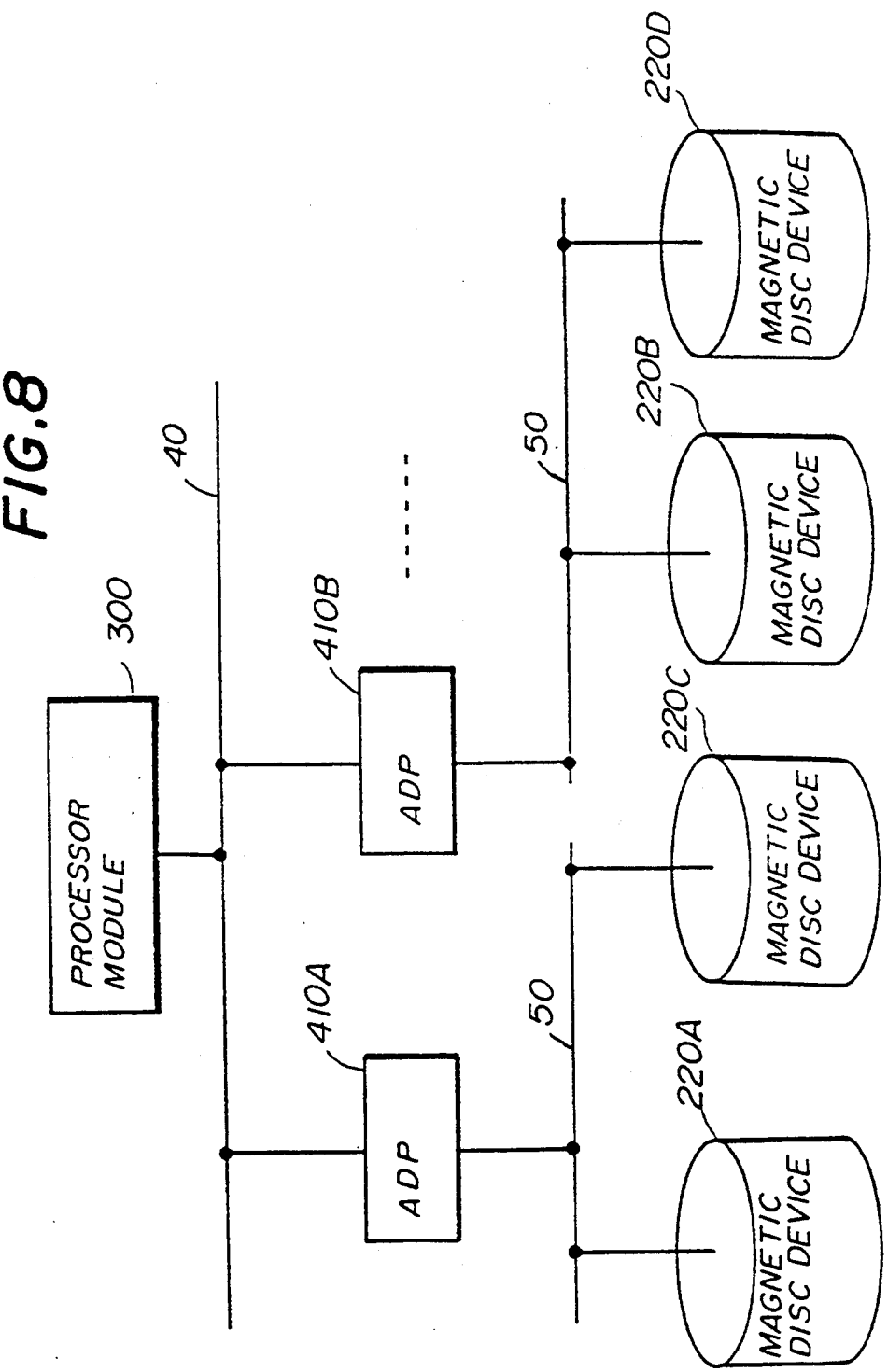

FIG.IOA
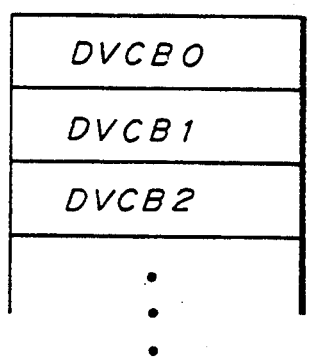
FIG.IOB
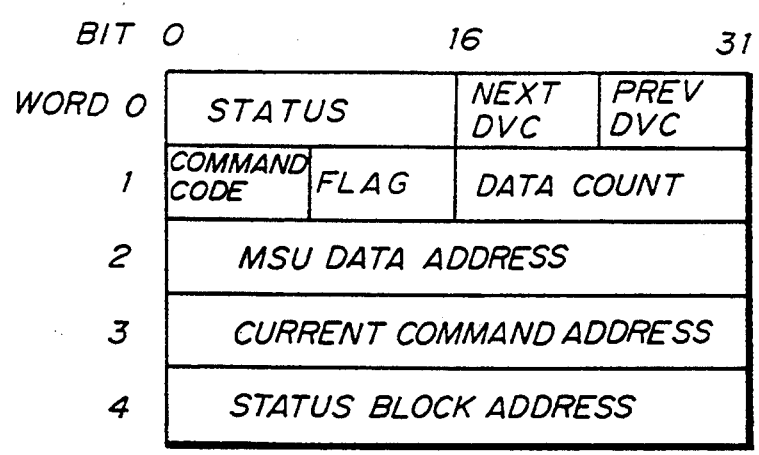

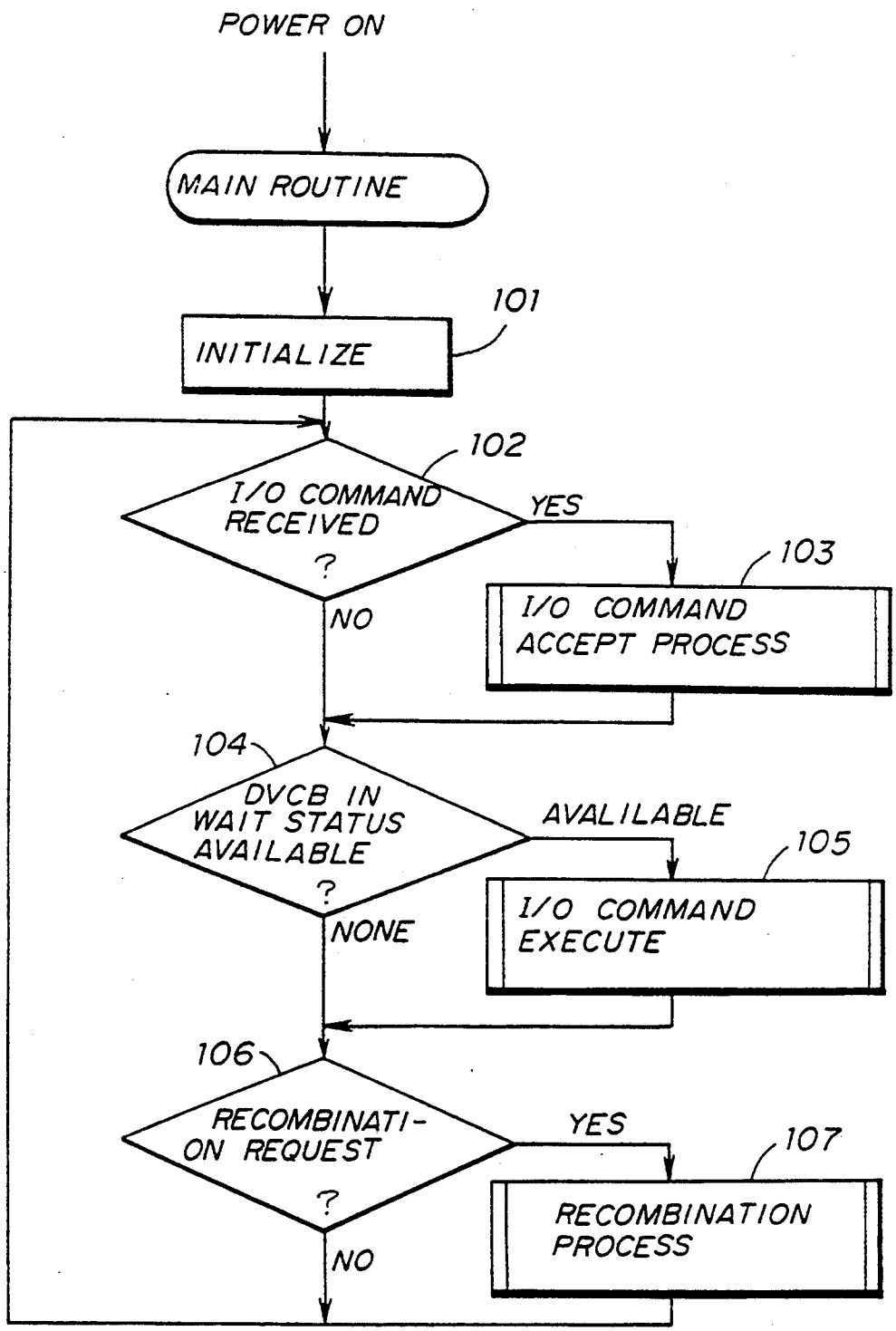

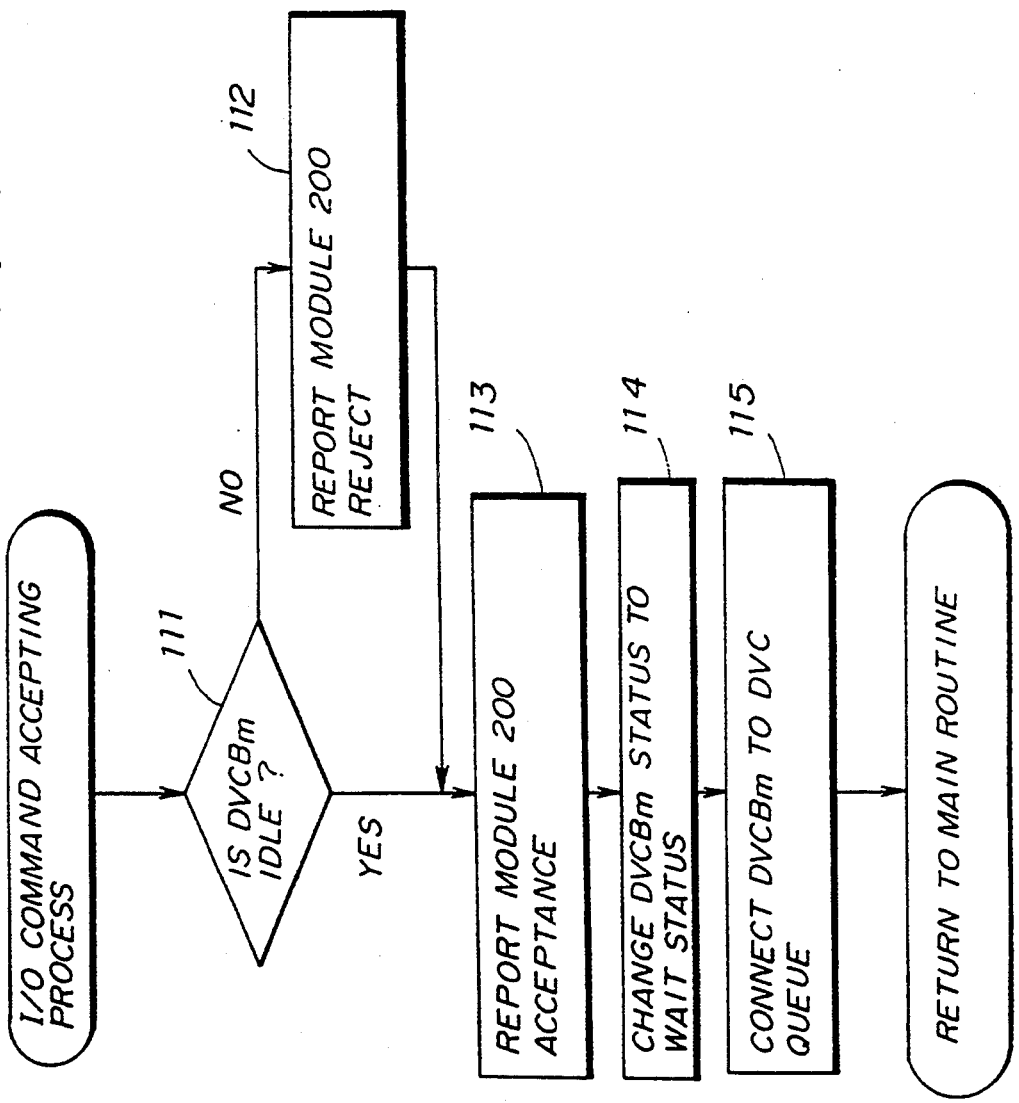

METHOD OF CONTROLLING A DUPLEX DATA STORAGE SYSTEM AND DATA PROCESSING SYSTEM USING THE SAME

CROSS REFERENCE TO RELATED APPLICATION

The present invention relates to U.S. application Ser. No. 07/547,031 filed Jul. 2, 1990 and entitled "Data Transmission Method and Data Processing System Using the Same Data" which is assigned to the common assignee herein.

BACKGROUND OF THE INVENTION (1) Field of the Invention

The present invention relates to a method of controlling a duplex data storage system and a data processing system using such a method. More specifically, the present invention is concerned with improvements in data transfer between a data processing device such as a processor module and a duplex data storage system composed of two external data storage units.

(2) Description of the Related Art

FIG. 1 shows a data processing system having a duplex data storage system. The data processing system shown in FIG. 1 is composed of a processor module, and a duplex data storage system consisting of two external data storage units 200A and 200B. The processor module 100 is, for example, a computer main frame. The external data storage unit 200A is composed of a controller 210A and a storage device 220A, such as a magnetic disc device 220A, and similarly the external data storage unit 200B is composed of a controller 210B and a storage device 220B.

When a storage controller 110 of the processor module 100 receives a request issued by the execution of a program by a request source 120, the storage controller 110 reads out data from an area of the request source 120 specified by the request and respectively instructs the external data storage units 200A and 200B to write the readout data into the storage devices 220A and 220B. During this operation, a common identification number defined in common for the external data storage units 200A and 200B is specified by the request source 120. The storage controller 110 receives the common identification number from the request source 120, and recognizes that the specified device is the duplex data storage system. Then, the storage controller 110 respectively issues two identical commands to write the readout data into the duplex data storage system (that is, the storage devices 220A and 220B). The controllers 210A and 210B respectively receive the command and respectively execute the received command. Then, the controllers 210A and 210B respectively receive the same readout data, and write the received readout data into identical areas of the storage devices 220A and 220B. When the control specified by the command is completed, each of the controllers 210A and 210B sends the storage controller 110 a write completion response showing the completion of the specified control.

In the above-mentioned way, the external data storage units 200A and 200B always have the same contents. With this arrangement, it is possible to ensure the stored data even if one of the external data storage units 200A and 200B has a failure.

It should be noted that conventionally, the storage controller 110 respectively receives the control completion reports from the controllers 210A and 210B and informs the request source 120 that the request has been completely executed.

The above-mentioned procedure is illustrated in FIG. 2. The request to write data into the duplex data storage system is generated at time T0, and then the command is generated. This command is successively sent to the controllers 210A and 210B. In the sequence shown in FIG. 2, the command is sent to the controller 210A first and the controller 210B second. The controller 210A starts to execute the received command, and then the controller 210B starts to execute the received command. Writing the readout data into the storage device 220A ends at time T1, and writing the same data into the storage device 220B ends at time T2. After time T2, the controller 110 recognizes the completion of writing the readout data into the duplex data storage system, and informs the request source 120 of the completion of the request. It is impossible for the request source 120 to process another job before it is informed that the request has been completely executed. Thus, the request source 120 cannot work efficiently and the throughput of the entire processor module 100 degrades.

SUMMARY OF THE INVENTION

It is a general object of the present invention to provide a method of controlling a duplex data storage system and a data processing system using such a method.

A more specific object of the present invention is to provide a method of controlling a duplex data storage system capable of processing a write control at a higher speed.

The above-mentioned objects of the present invention are achieved by a method of controlling a duplex data storage system having two data storage units, each having a data storage device, the method comprising the steps of: respectively sending to each of the data storage units, from a processor module coupled to the two data storage units, a data write request to write data in each of the two data storage units; respectively sending, from the processor module, data specified by the data write request to each of the two data storage units; respectively writing the data in data buffers respectively provided in the two data storage units; respectively sending, from each of the two data storage units, a buffer write completion response to the processor module when the data has been completely written into each of the two data buffers; respectively writing the data stored in the data buffers into the two data storage devices; and determining whether or not the storage unit write completion response from each of the two data storage units has been received, so that the processor module recognizes that the data write request has been completed when it is determined that the write completion responses from each of the two data storage units has been received.

The above-mentioned objects of the present invention are also achieved by a method of controlling a duplex data storage system having two data storage units, each having a data storage device, the method comprising the steps of: respectively sending to each of the data storage units from a processor module coupled to the two data storage units, a data write request to write data in each of the two data storage units; respectively sending, from the processor module, data specified by the data write request to each of the two data storage units; respectively writing the data in data buffers respectively provided in the two data storage units;

respectively sending, from each of the two data storage units, a first write completion response to the processor module when the data has been completely written into each of the two data buffers; respectively writing the data stored in the data buffers into the two data storage devices; and respectively sending, from each of the two data storage units, a second write completion response to the processor module when the data has been completely written into each of the two data storage devices; and determining whether or not the first write completion response from each of the two data storage units and the second write completion response from one of the data storage units have been received, so that the processor module recognizes that the data write request has been completed when it is determined that the first write completion response from each of the two data storage units and the second write completion response from one of the data storage units have been received.

Another object of the present invention is to provide a data processing system based on the above-mentioned method.

This object of the present invention is achieved by a data processing system comprising: a processor module; and a duplex data storage system having a first data storage unit and a second data storage unit. Each of the first and second data storage units comprises: a data buffer storing data specified by a data write request generated by the processor module and sent from the processor module; a data storage device storing the data supplied from one of the data buffer and the processor module; control means for reading out the data from the data storage device and for writing the data into the data storage device; and determining means for determining whether or not the data has been completely written into the data buffer and for sending a write completion response to the processor module when it is determined that the data has been completely written into the data buffer. The processor module comprises means for determining whether or not the write completion response from each of the first and second data storage devices has been received, so that the processor module recognizes that the data write request has been completed when it is determined that the write completion responses from each of the two data storage devices has been received.

The above object of the present invention is also achieved by a data processing system comprising: a processor module; and a duplex data storage system having a first data storage unit and a second data storage unit. Each of the first and second data storage units comprises: a data buffer storing data specified by a data write request generated by the processor module and sent from the processor module; a data storage device storing the data supplied from one of the data buffer and the processor module; control means for reading out the data from the data storage device and for writing the data into the data storage device; first determining means for determining whether or not the data has been completely written into the data buffer and for sending a first write completion response to the processor module when it is determined that the data has been completely written into the data buffer; second determining means for determining whether or not the data read out from the data buffer has been completely written into the data storage device and for sending a second write completion response to the processor module when it is determined that the data has been completely written into the data storage device. The processor module comprises means for determining whether or not the first write completion response from each of the first and second data storage units and the second write complete message from one of the first and second data storage units have been received, so that the processor module recognizes that the data write request has been completed when it is determined that the first write completion response from each of the first and second data storage units and the second write complete message from one of the first and second data storage units have been received.

BRIEF DESCRIPTION OF THE DRAWINGS

Other objects, features and advantages of the present invention will become more apparent from the following detailed description when read in conjunction with the accompanying drawings, in which:

FIGS. 4A and 4B are respectively time charts showing first and second operations of the data processing system shown in FIG. 3;

FIG. 6 is a block diagram showing a data transfer mode;

FIGS. 7A and 7B are block diagrams showing another data transfer mode;

FIG. 8 is a block diagram of an alternative system of the data processing system shown in FIG. 3;

FIGS. 10A and 10B are diagrams illustrating control information managed by each input/output adapter shown in FIGS. 3 and 8;

FIG. 11 is a flowchart of a main routine executed by each input/output adapter shown in FIGS. 3 and 8;

FIG. 12 is a flowchart of an input/output command accepting procedure executed by each input/output adapter shown in FIGS. 3 and 8;

DESCRIPTION OF THE PREFERRED EMBODIMENTS

Figure 3:
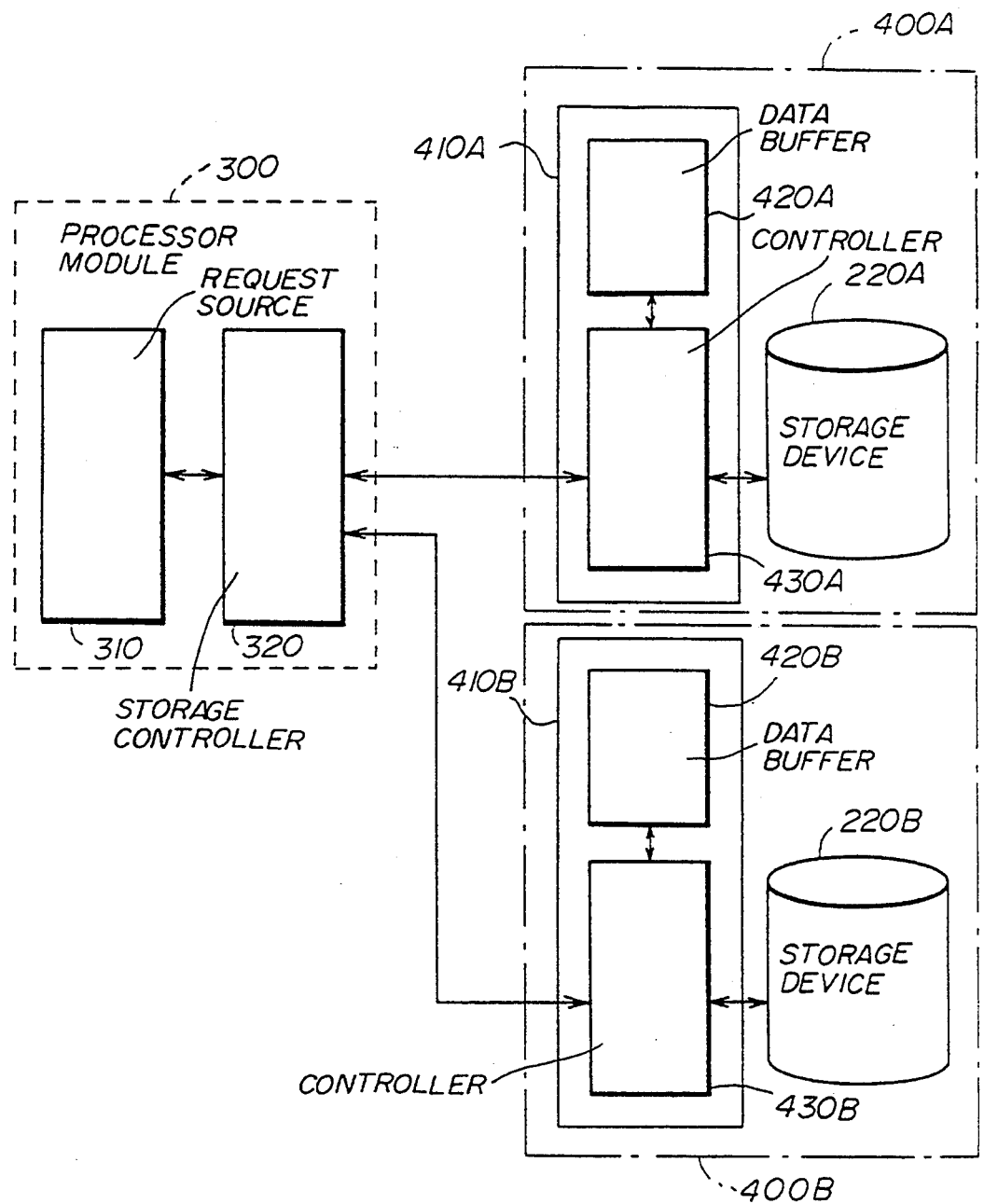
FIG. 3 is a block diagram showing an outline of a data processing system according to the present invention.

FIG. 3 shows an outline of a data processing system according to the present invention. The data processing system shown in FIG. 3 is composed of a processor module 300, and a duplex data storage system, which is composed of two external data storage units 400A and 400B. The external data storage unit 400A is composed of an input/output adapter 410A and the aforementioned storage device 220A. Similarly, the external data storage unit 400B is composed of an input/output adapter 410B and the aforementioned storage device 220B. The input/output adapter 410A is composed of a data buffer 420A and a controller 430A. Similarly, the input/output adapter 410B is composed of a data buffer 420B and a controller 430B. Each of the data buffers 420A and 420B can be formed of, for example, a semiconductor random access memory (RAM). The processor module 300 includes a request source 310 and a storage controller 320.

The controller 430A is connected to the data buffer 420A, the storage device 220A and the storage controller 320, and controls the data buffer 420A and the storage device 220A. Similarly, the controller 430B is connected to the data buffer 420B, the storage device 220B and the storage controller 320, and controls the data buffer 420B and the storage device 220B.

FIG. 4A is a time chart showing a first operation of the data processing system shown in FIG. 3. Referring to FIGS. 3 and 4, the request source 310 generates, at time T0, a request to write data stored therein into the duplex data storage system composed of the external data storage units 400A and 400B. In response to the request from the request source 310, the storage controller 320 issues the aforementioned command defined identically for the external data storage units 400A and 400B. The storage controller 320 sends the command to the controller 430A, and then sends the same command to the controller 430B. In response to the command, the controller 430A receives data transferred from the processor module 300, and starts to control the data buffer 420A, so that the data is written into the data buffer 420A. In response to the command issued after the command sent to the external data storage unit 400A, the controller 430B receives the same data from the processor module 300, and starts to control the data buffer 420B, so that the same data is written into the data buffer 420B. It should be noted that the controller 430B starts to operate after the controller 430A starts to operate. All data related to the request has been completely written into the data buffer 420A at time T1 and, on the other hand, the same data has been completely written into the data buffer 420B at time T2 which lags behind time T1. When the buffering of data is completed, each of the controllers 430A and 430B sends a buffer write completion response to the storage controller 320. That is, the controller 430A sends the write completion response to the controller 320 at time T1, and the controller 430B sends the write completion response to the controller 320 at time T2. When the storage controller 320 has received the above two write completion responses, it recognizes that the request has been completely executed, and informs the request source 310 of this fact. Thereby, the request source 310 recognizes the completion of the request, and can process a next job.

Figure 1:
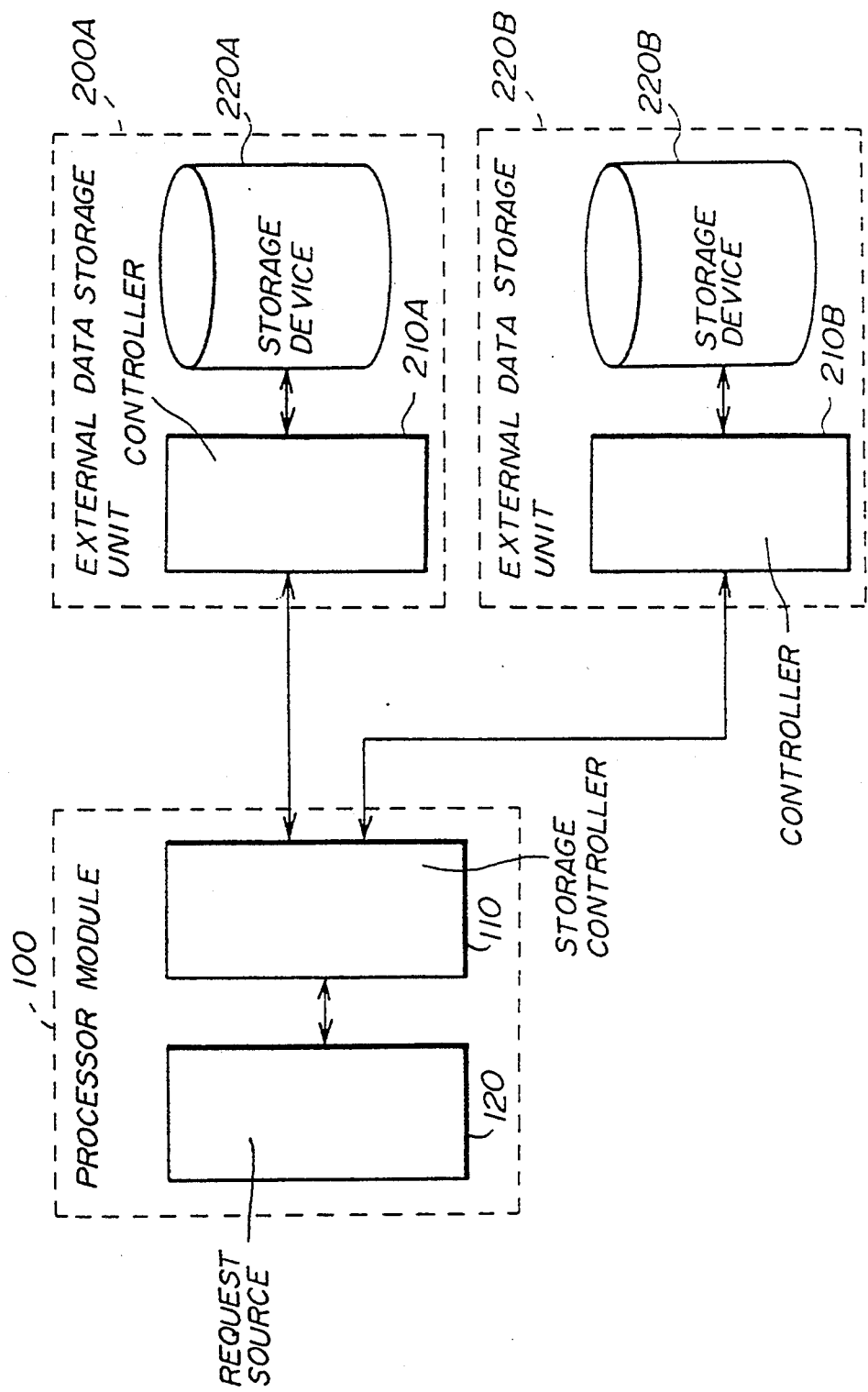
FIG. 1 is a block diagram of a conventional data processing system having a duplex data storage system.
Figure 2:
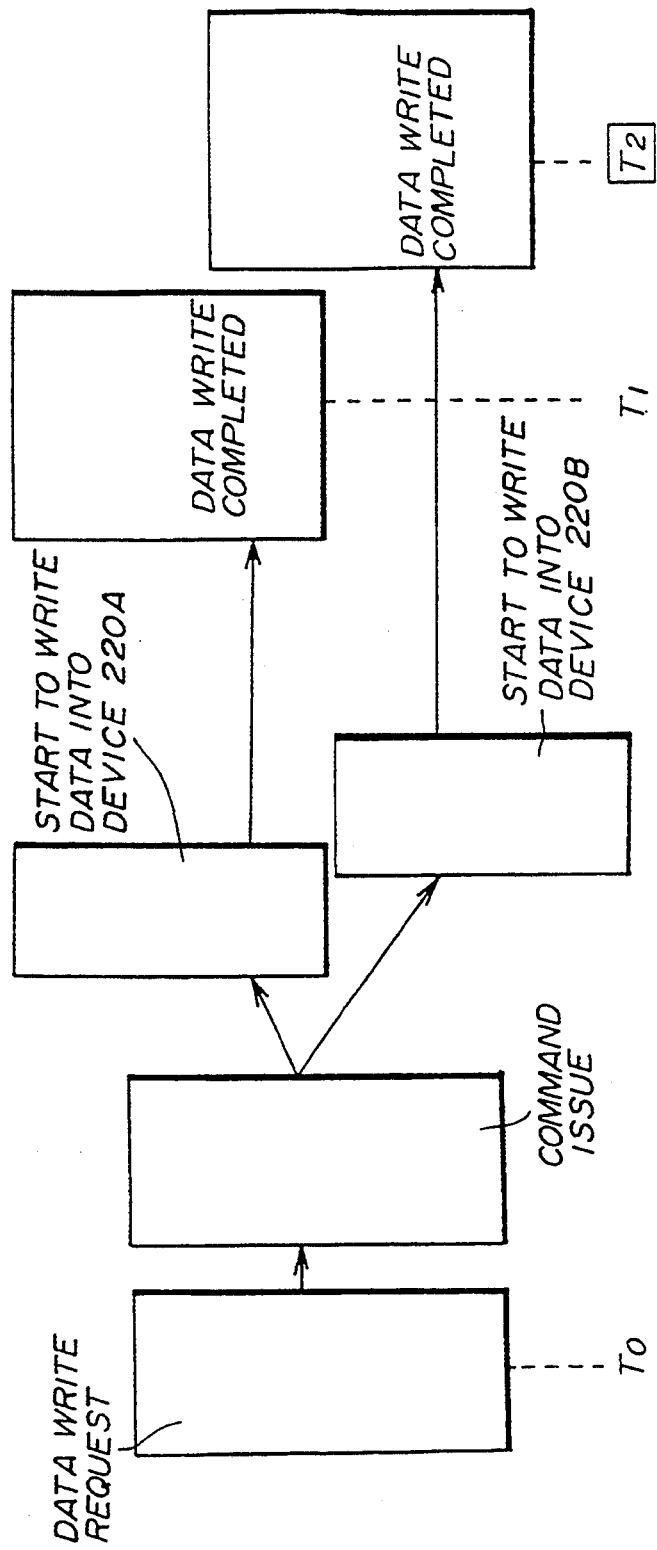
FIG. 2 is a time chart showing the operation of the data processing system shown in FIG. 1.

Meanwhile, the data written into the data buffer 420A is transferred to and written into the storage device 220A under the control of the controller 430A. At time T3, all data has been completely written into the storage device 220A. Similarly, the data written into the data buffer 420B is transferred to and written into the storage device 220B under the control of the controller 430B. At time T4, all data has been completely written into the storage device 220B. It should be noted that conventionally, the write completion response is sent to the storage controller 110 (FIG. 1) at time T4 (when storage into device 220B is completed).

FIG. 4B shows the alternative of the sequence shown in FIG. 4A. The final write completion response is not generated at times T1 and T2 but a storage unit write completion response is generated at time T3 when writing all data into the storage device 220A ends. At this time, the same data from the processor module 300 is being written into the storage device 220B. The generation of the write completion response related to the external data storage device 400B lags behind that related to the external data storage device 400A. It will be noted that an error or fault may occur during the period between time T2 and T3. If an error occurs in the external data storage unit 400A during the period between time T2 and T3, data may be damaged. Thus, even if the writing of data into the storage device 220A is completed at time T3, such written data may be defective.

The sequence shown in FIG. 4B is directed to eliminating such a problem. As has been indicated above, the storage unit write completion response is transferred to the storage controller 320 when the data requested has been completely written into one of the storage devices 220A and 220B. Thus, in the example shown in FIG. 4B, the contents of the storage device 220A are ensured. Hence, if the writing of data into the storage device 220B is defective, it is possible to ensure the contents of the storage device 220B by writing the contents of the storage device 220A into the storage device 220B.

Figure 5:
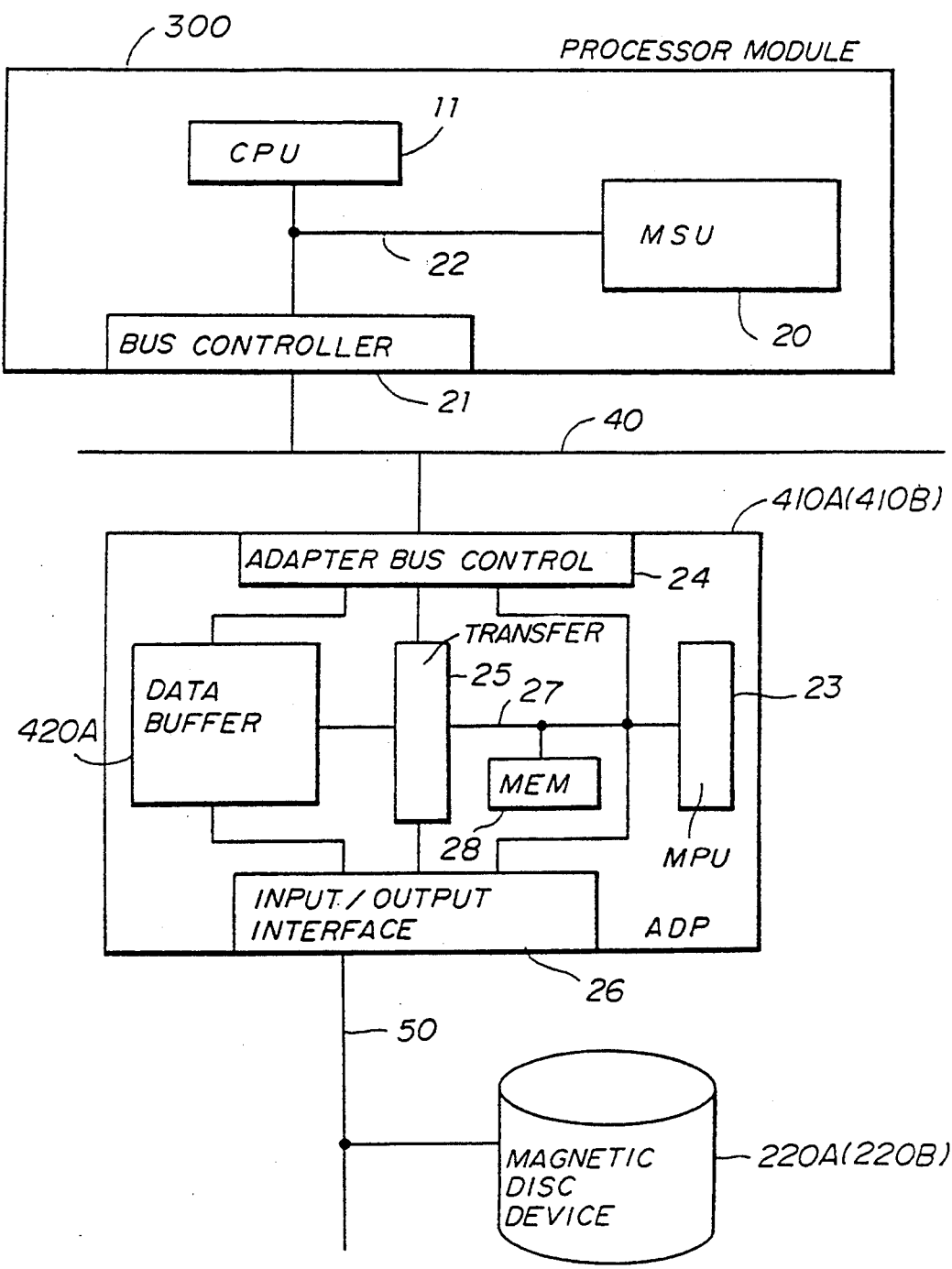
FIG. 5 is a block diagram showing the data processing system shown in FIG. 3 in more detail.

A description will now be given of the structure of the data processing system shown in FIG. 3. FIG. 5 shows the data processing system in more detail. The data processing system shown in FIG. 5 is based on a system disclosed in U.S. patent application Ser. No. 477,549, abandoned, in favor of 07/899,946, now U.S. Pat. No. 5,201,052, also incorporated herein by reference the disclosure of which is hereby incorporated by reference. As shown, the data processing system is composed of the processor module 300, the input/output adapters 410A and 410B (only the adapter 410A is illustrated for the sake of convenience), and the storage devices 220A and 220B (only the device 220A is illustrated for the sake of convenience). In the present embodiment, each of the storage devices 220A and 220B is formed of a magnetic disc device. A bus 40 connects the processor module 200 and the input/output adapters 410A and 410B together. An input/output bus 50 connects the input/output adapter 410A and the magnetic disc device 220A. The input/output adapter 410B and the magnetic disc device 220B are formed in the same way as described above.

The processor module 300 is composed of a central processing unit (hereafter simply referred to as CPU) 11, a main storage unit (hereafter simply referred to as MSU) 20, a bus controller 21 and an internal bus 22. The aforementioned request source 310 shown in FIG. 3 corresponds to the CPU 11 and the MSU 20, and the aforementioned storage controller 320 corresponds to the CPU 11 and the bus control circuit 21. The input/output adapter (ADP) 410A is composed of a main processing unit (MPU) 23, an adapter bus control circuit 24, a data transfer controller 25, an input/output counter interface controller 26, an internal bus 27, a memory 28 and the aforementioned data buffer 420A. The aforementioned controller 430A corresponds to the above-mentioned parts other than the data buffer 420A.

When the CPU 11 acknowledges the occurrence of a renewal or updating request (read or write request) to the duplex data storage system, it sends, through the bus control circuit 21, the input/output adapter 410A information about a beginning address related to data which is to be updated and the size of the data. The same data is also transferred to the input/output adapter 410B. For the sake of simplicity, only the input/output adapter 410A will be explained below. The information is transferred on the bus 40 and then input to the adapter bus controller 24 of the input/output adapter 410A. The information is then supplied to the MPU 23 through the internal bus 27, and the MPU 23 analyzes the content of the received information. It will be noted that there are two transfer (write) modes, one of which is a normal mode and the other of which is a high-reliability mode. In the normal mode, data transfer is carried out in a way as shown in FIG. 6. In the high-reliability mode, the data transfer is carried out in a way as shown in FIGS. 7A and 7B.

Referring to FIG. 6, the MSU 20 shown in (A) of FIG. 6 stores a physical block 10 which has been updated. The physical block 10 contains an area 10a which has been transferred to the magnetic disc device 220A, an area 10b which has been transferred to the input/output adapter (ADP) 410A, and an area 10c which has not yet been read out from the MSU 20. When a predetermined amount of data is transferred from the MSU 20 to the data buffer 420A built in the input/output adapter 410A, the data is then transferred to the magnetic disc device 220A in a first-in first-out (FIFO) process, starting from the beginning of the received data. The input/output adapter 410A drives the bus 40 provided between the MSU 20 and the input/output adapter 410A, and the input/output bus 50 between the input/output adapter 410A and the magnetic disc device 220A at the same time. Thus, it is possible to reduce the time it takes to renew or update data.

FIGS. 7A and 7B illustrate the high-reliability mode in which the data buffers 420A and 420B are used. Referring to FIG. 7A, the physical block 10 in the MSU 20 is transferred to the data buffer 420A through the bus 40 under the control of the CPU 11. If a fault occurs in the CPU 11, MSU 20, the bus 40 or the like during the data transfer operation, the input/output adapter 410A does not carry out data transfer to the magnetic disc device 220A. Thus, in such circumstances, data in the magnetic disc device 220A is never destroyed. When the CPU 11 confirms that all data has been transferred to the data buffer 420A in the input/output adapter 410A, the adapter 410A sends the aforementioned write completion response to the processor module 300 and starts to transfer the data in the data buffer 420A to the magnetic disc device 220A, as shown in FIG. 7B. After the data transfer from the MSU 20 to the input/output adapter 410A is completed, data in the data buffer 420A of the input/output adapter 410A is transferred to the magnetic disc device 220A even if a fault occurs in the CPU 11, the MSU 20, the bus 40 or the like. It should be noted that in this case, the contents of the input/output can be updated or renewed correctly.

When the information produced and output by the CPU 11 indicates the high-reliability mode, the MPU 23 instructs the data transfer controller 25 to input data read out from the MSU 20 of the processor module 300 through the adapter bus controller 24. If the adapter bus controller 24 informs the data transfer controller 25 of the occurrence of an error related to the processor module 300 or the bus 40 during the time when data is being transferred from the MSU 20 to the data buffer 420A, the data transfer controller 25 stops the data transfer, and reports the occurrence of a fault to the MPU 23. In response to this report, the MPU 23 stops the input/output operation (data transfer).

When the data transfer controller 25 of the input/output adapter 410A determines that all data equal to one physical block have been stored in the data buffer 420A without any errors, the data transfer controller 25 returns the write completion response to the processor module 300 and instructs the input/output interface controller 26 to transfer the data to the magnetic disc device 220A. The input/output interface controller 26 transfers the data from the data buffer 420A to the magnetic disc device 220A through the input/output bus 50 so that the contents of the magnetic disc device 220A are updated.

If a fault occurs in the input/output bus 50 or the magnetic disc device 220A during the time when data is being transferred to the magnetic disc device 220A, the MPU 23 reports the occurrence of the fault to the CPU 11. When all data has been transferred to the magnetic disc device 220A without having any errors, the MPU 23 reports the completion of data transfer to the CPU 11 by sending the aforementioned write completion response (in the case shown in FIG. 4B). The CPU 11 understands the contents of the report from the MPU 23, and determines whether the updating and transfer procedure should be ended or a recovery procedure should be carried out. The recovery procedure is executed when a fault occurs in the magnetic disc device 220A. In the recovery procedure, the other magnetic disc device 220B is updated. That is, data is read out from the data buffer 420A or the magnetic disc device 220A and written into the other magnetic disc device 220B.

FIG. 8 is a variation of the configuration shown in FIG. 5. A data processing system shown in FIG. 8 is made up of the processor module 300, two input/output adapters 410A and 410B, and a plurality of magnetic disc devices 220A, 220B, 220C and 220D. The adapters 410A and 410B are connected to the bus 40. Also, each of the adapters 410A and 410B is connected to one of the input/output buses 50. The magnetic disc device 220C is coupled to the input/output adapter 410A via the input/output bus 50 in addition to the magnetic disc device 220A shown in FIG. 3. Similarly, the magnetic disc device 220D is coupled to the input/output adapter 410B via the input/output bus 50 in addition to the magnetic disc device 220B. The input/output adapter 410A selects either the magnetic disc device 220A or 220B, and the input/output adapter 410B selects either the magnetic disc device 220C or 220D. Thus, the configuration obtained at this time is substantially the same as that shown in FIG. 3.

Figure 9A:
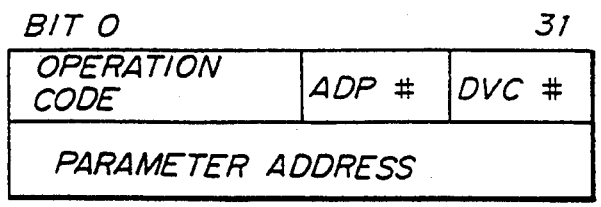
FIGS. 9A through 9D are diagrams illustrating data and information managed by a processor module shown in FIGS. 3 and 8.

FIGS. 9A through 9D show data managed by the CPU 11 of the processor module 300 shown in FIG. 5. Referring to FIG. 9A, there is illustrated an input/output command, which is composed of an operation code, an input/output adapter number ADP#, a magnetic disc device number DVC#, and a parameter address. When the operation code is equal to 0001, it indicates that a DVC (device control) operation should be started. The DVC operation is illustrated in FIG. 11. When the operation code is equal to 0002, it indicates that the DVC operation should be cleared. The input/output adapter number ADP# indicates one of the input/output adapters 410A and 410B shown in FIG. 3 or FIG. 8. The magnetic disc device number DVC# indicates one of the magnetic disc devices 220A and 220B shown in FIG. 8.

Figure 9B:
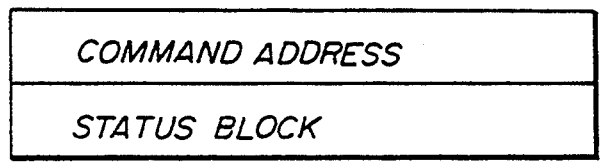
Figure 9C:
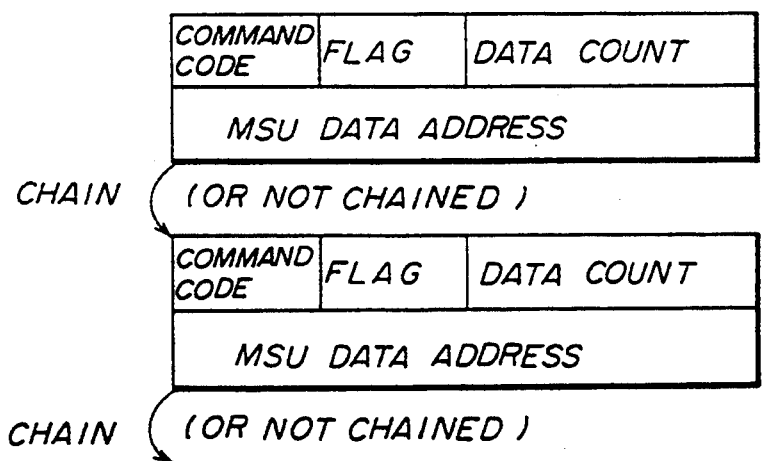

The parameter address of the input/output command shown in FIG. 9A indicates a command address and a status block, as shown in FIG. 9B. The command address indicates an area in the MSU 20 in which a command shown in FIG. 9C is stored. The command is composed of a command code, a flag, a data count and a MSU data address. When the command code is equal to 01, it indicates the normal mode. When the command code is equal to 03, it indicates the high-reliability mode. When the command code is equal to 02, it indicates a read mode in which data is transferred from one of the magnetic disc devices 220A and 220B to the processor module 300. The data count indicates an amount or data count to be transferred. The MSU data address indicates the start address of an area of the MSU 20 in which the data to be transferred is stored. It is possible to chain a plurality of commands together, so that a plurality of procedures are instructed by a single input/output command. It is also possible to chain a plurality of data pieces together, so as to be recognized to be a single data piece.

Figure 9D:
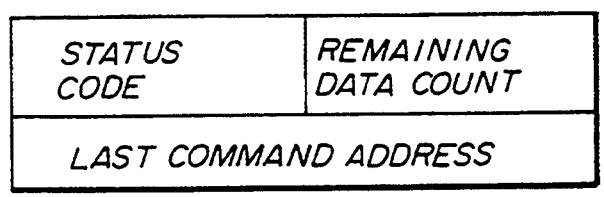

The status block contained in the parameter shown in FIG. 9D is composed of a status code, the number of or amount of data remaining corresponding to the data count and the a last command address. The relationship between the possible values of the status code and corresponding meanings of the status code is shown in Table 1.

TABLE

| Status code | Meaning |
| --- | --- |
| 0001 | normal end |
| 0002 | device error |
| 0003 | parameter error |
| 0004 | interface error. |

The data count indicates the amount of data which are left or remaining to be stored when a command was executed last. The last command address indicates the address of the command which was executed last. The CPU 11 of the processor module 300 can acknowledge the status of the execution obtained when the command was executed last.

Each of the input/output adapters 410A and 410B manages control information shown in FIGS. 10A and 10B. Referring to FIG. 10A, there is illustrated a table of device control block (DVCB) control information. The DVCB control information contains control information about each of the magnetic disc devices 220A and 220B. For example, DVCB0 denotes control information about the magnetic disc device DVC0 (for example, device 220A).

The content of the control information about each of the magnetic disc devices 220A through 220D is shown in FIG. 10B. The control information is composed of five words 0–4. Word 0 is composed of a status code, a next DVC number, and a previous DVC number. When the status code is equal to 0000, it indicates the status where no command is executed. When the status code is equal to 0001, it indicates a wait status where the input/output command being considered is connected to or in a DVC queue and the input/output adapter 410A is waiting for the occurrence of a state where the input/output bus 50 becomes idle. When the status code is equal to 0002, it indicates a work status where the magnetic disc device 220A being considered is connected to the input/output bus 50 and the input/output command is being executed. When the status code is equal to 0003, it indicates a disc state where the magnetic disc device 220A being considered is operating (seeking some data) and is detached from the input/output adapters 410A and 410B. The Next DVC indicates the identification number of the magnetic disc device 220A which will be connected at the end of a DVC which is in the DVC queue in the wait status (0001). The previous DVC indicates the number of the magnetic disc device 220A which will be in the beginning of a DVC which is in the DVC queue in the wait status.

Word 1 is composed of the command code, a flag and data count, which are identical to those shown in FIG. 9C. Word 2 relates to the MSU data address shown in FIG. 9C. Words 1 and 2 indicate the contents of the command which is being executed or waiting for execution. When the status code indicates the disc state (0003), words 1 and 2 indicate the intermediate progress of execution.

Word 3 relates to a current command address which indicates the address of a command which is executed or waiting for execution. Word 4 relates to a status block address of the status block shown in FIG. 9D which is obtained and stored when the execution of the input/output command is completed.

FIG. 11 is a flowchart of a main routine which is executed by each of the input/output adapters 410A and 410B. A procedure of the main routine is defined in the memory 28 in each of the input/output adapters 410A and 410B shown in FIG. 7. After the power supply to each of the input/output adapters 410A and 410B is turned ON, an initialization procedure is carried out (step 101). The MPU 23 determines whether or not the aforementioned input/output command occurred and output by the processor 200 has been received (step 102). When the input/output command has been received, the MPU 23 executes an input/output command accepting procedure (step 103).

FIG. 12 is a flowchart of the input/output command accepting procedure executed at step 103. The procedure shown in FIG. 12 relates to a case where the input/output command received at step 102 (FIG. 11) is addressed to the magnetic disc device 220A having number DVCBm. The MPU 23 refers to the control information DVCBm (FIG. 10B) for the magnetic disc device DVCm. Then, the MPU 23 determines whether the magnetic disc device DVCm is in the idle status. When the result obtained at step 111 is NO, the MPU 23 sends the processor module 300 a response which indicates that the input/output command is rejected (step 112). When it is determined that the result at step 111 is idle, step 113 is executed. The MPU 23 sends the processor module 300 a response which indicates that the input/output command has been accepted (step 113). Then, the MPU 23 changes the status of the magnetic disc device DVCBm to the wait status (step 114). Then, the MPU 23 connects the control information DVCBm about the magnetic disc device DVCm to the end of the DVC queue. After that, the input/output command accepting procedure returns to the main routine shown in FIG. 11.

Returning now to FIG. 11, the MPU 23 determines whether or not there is available a magnetic disc device which is in the wait status (step 104). When it is determined that a magnetic disc device in the wait status is available, the MPU 23 executes the input/output command (step 105).

Figure 13:
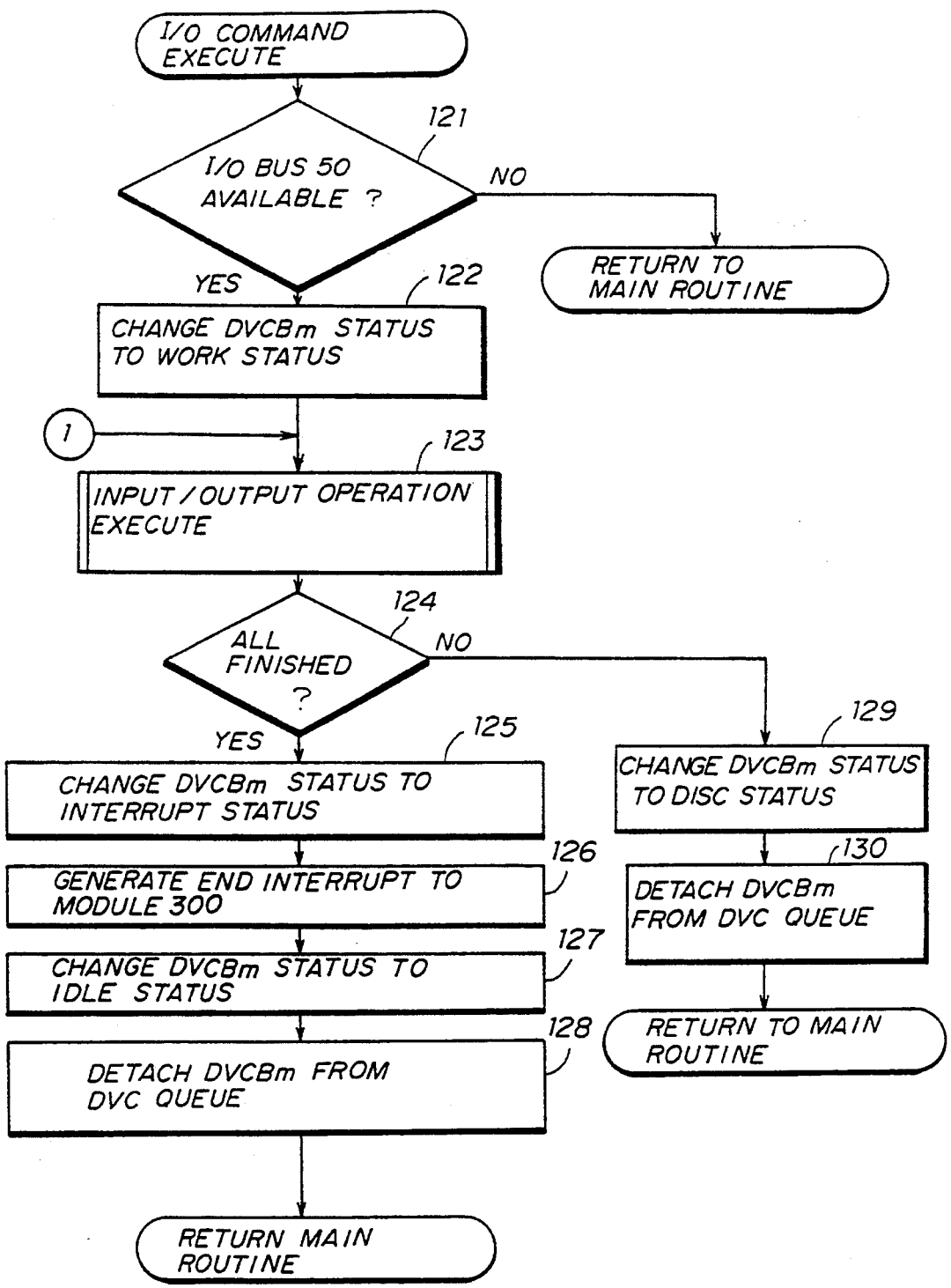
FIG. 13 is a flowchart of an input/output command execution procedure performed by each input/output adapter shown in FIGS. 3 and 8.

FIG. 13 is a flowchart of the execution of the input/output command. The procedure shown in FIG. 13 relates to a case where DVCBm is at the top (beginning) of the DVC queue. The MPU 23 determines whether or not the input/output bus 50 is being used (step 121). When it is determined that the input/output bus 50 is being used, the procedure returns to the main routine shown in FIG. 11. On the other hand, when it is determined that the input/output bus 50 is idle, the MPU 23 changes the status of DVCBm to the work status (step 122). Then, the input/output operation is executed under the control of the MPU 23 (step 123). Data is read out from the data buffer 420A (FIG. 7) and is then transferred to the magnetic disc device DVCm. The MPU 23 determines whether or not all of the operation is completed (step 124). When the result obtained at step 125 is YES, the MPU 23 changes the status of DVCBm to the interrupt status (step 125). Then, the MPU 23 generates an end interrupt addressed to the processor module 300 (step 126). After that, the MPU 23 changes the status of DVCBm to the idle status (step 127). Finally, the MPU 23 detaches DVCBm from the DVC queue (step 128). Then, the procedure returns to the main routine shown in FIG. 11.

On the other hand, when the result obtained at step 124 is NO, the MPU 23 changes the status of DVCBm to the disc status (step 129). After that, the MPU 23 detaches DVCBm from the DVC queue (step 130). Then, the procedure returns to the main routine shown in FIG. 11.

Figure 14:
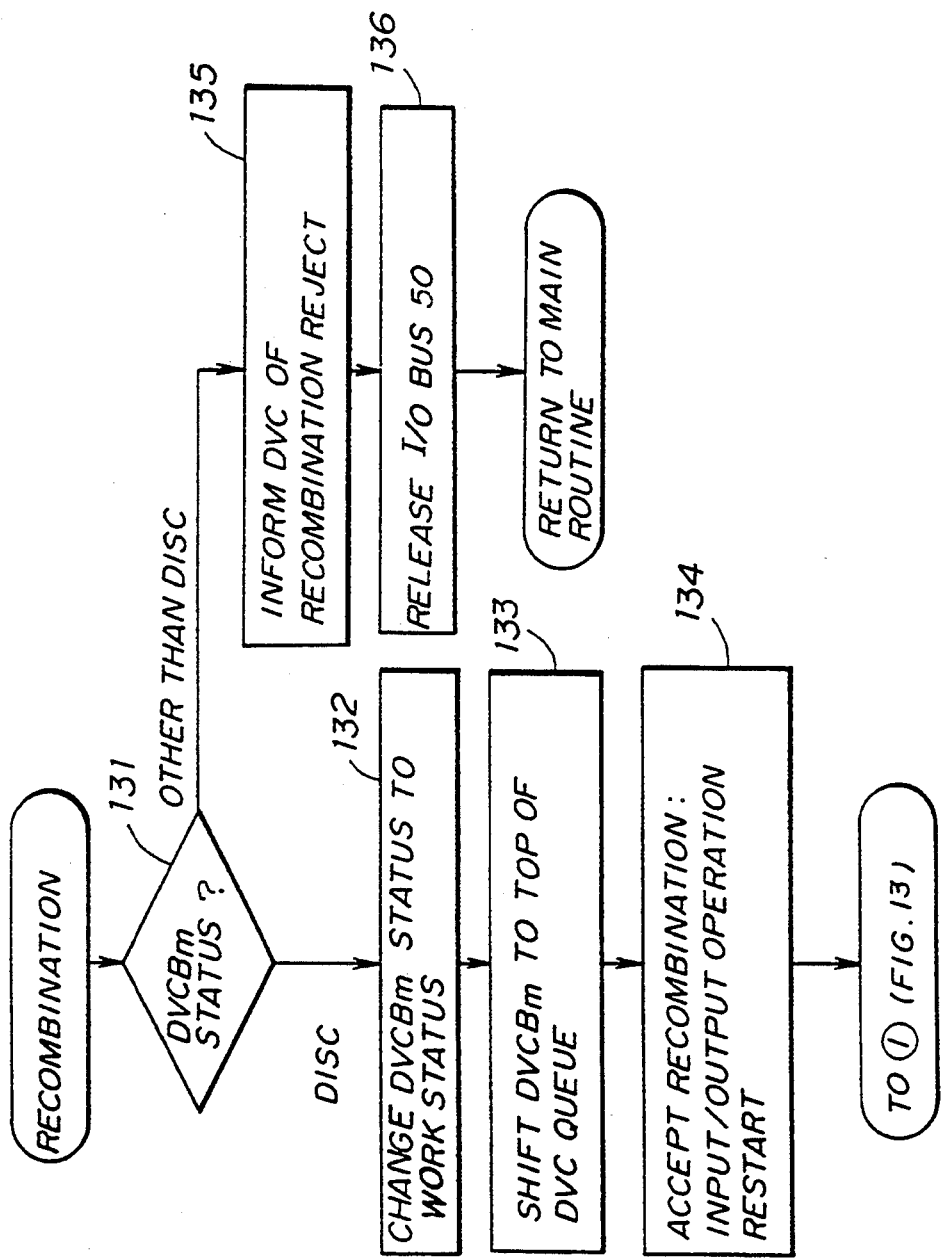
FIG. 14 is a flowchart of a recombination procedure executed by each input/output adapter shown in FIGS. 3 and 8.

Returning now to FIG. 11, the MPU 23 determines whether or not a recombination request is or has been generated (step 106). FIG. 14 is a flowchart of the recombination procedure executed at step 107. The flowchart shown in FIG. 14 relates to a case where a recombination request is generated from the magnetic disc device DVCm. The MPU 23 determines whether or not the status of DVCBm is the disc status (step 131). When the result obtained at step 131 is YES, the MPU 23 changes the status of DVCBm to the work status (step 132). Then, the MPU 23 shifts the DVCBm to the top of the DVC queue (step 133). After that, a recombination acceptance input/output operation is started again (step 134). Then, the procedure proceeds to step 123 shown in FIG. 13. On the other hand, when the result obtained at step 131 is NO, the MPU 23 informs the magnetic disc drive DVCm of the rejection of the recombination command (step 135). Then, the input/output bus 50 is released under the control of the MPU 23 (step 136). Then, the procedure returns to the main routine shown in FIG. 11.

Figure 15:
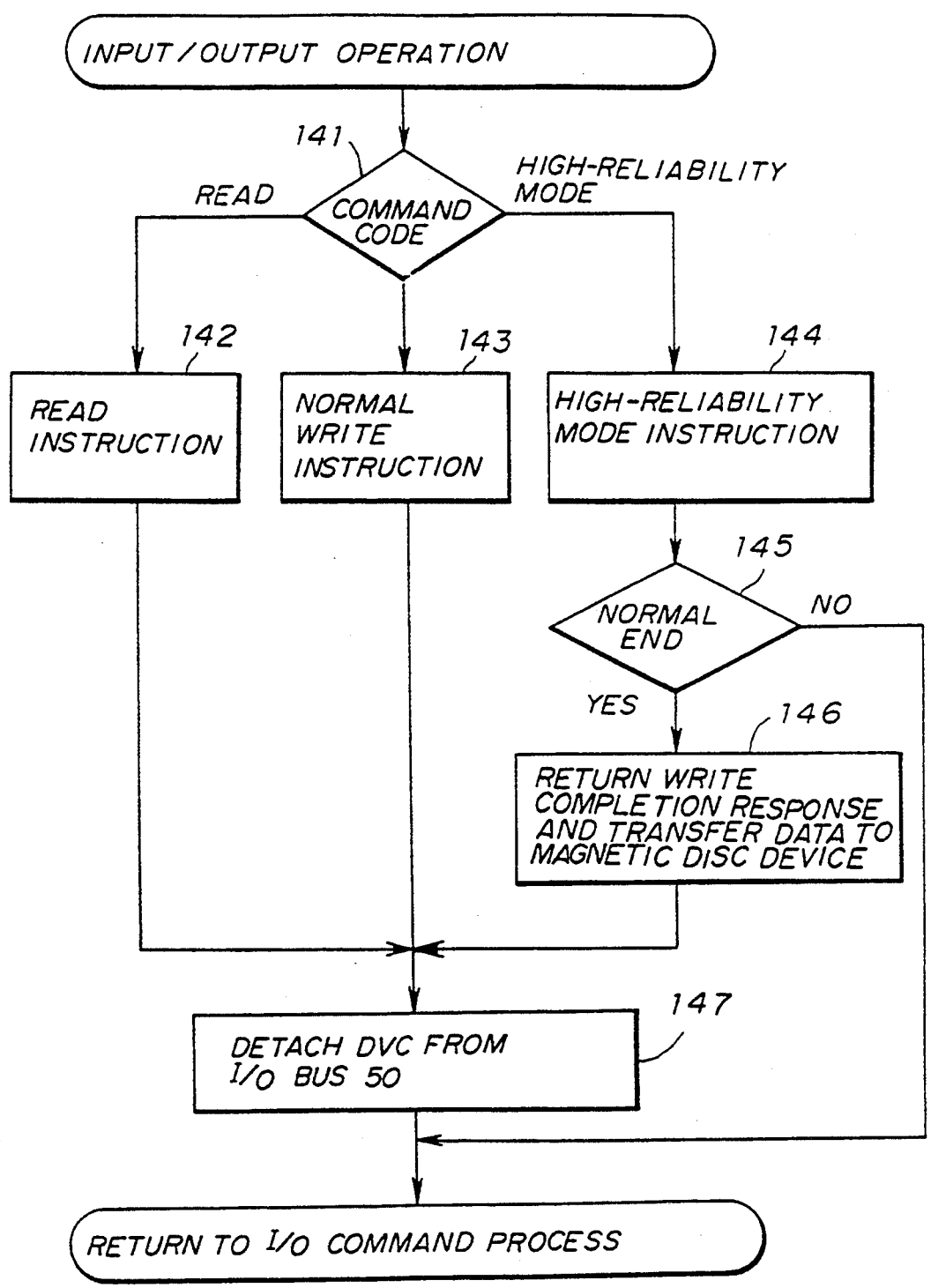
FIG. 15 is a flowchart of an input/output operation of the data processing system shown in FIGS. 3 and 8.

FIG. 15 is a flowchart of the input/output operation. The MPU 23 determines what is indicated by the command code contained in the command received from the processor module 300 (step 141). When it is determined that the read operation is instructed (command code being equal to 02), the MPU 23 instructs the adapter bus controller 24, the input/output interface controller 26 and the data transfer controller 25 to operate in the read mode (step 142). In the read mode, data is read out from the related magnetic disc device 220A and transferred to the MSU 20 through the input/output adapter 410A. When it is determined, at step 141, that the normal write mode is instructed (command code being equal to 01), the MPU 23 instructs the adapter bus controller 24, the input/output interface controller 26 and the data transfer controller 25 to operate in the normal write mode (step 143). When it is determined, at step 144, that the high-reliability mode is instructed, the MPU 23 instructs the adapter bus controller 24 and the data transfer controller 25 to input data from the MSU 20 into the data buffer 420A. Then, the MPU 23 determines whether or not the transfer operation has been completed without having any errors (step 145). When the result at step 145 is YES, the MPU 23 sends the write completion response to the processor module 300 and instructs the data transfer controller 25 and the input/output interface controller 26 to transfer data from the data buffer 420A to the related magnetic disc device 220A (step 146). On the other hand, when the result obtained at step 145 is NO, the procedure returns to the input/output command process.

Step 147 is executed after step 142, step 143 or step 146 is executed. At step 147, the MPU 23 waits for the completion of disconnection of the corresponding magnetic disc device 220A from the input/output bus 50.

Figure 16:
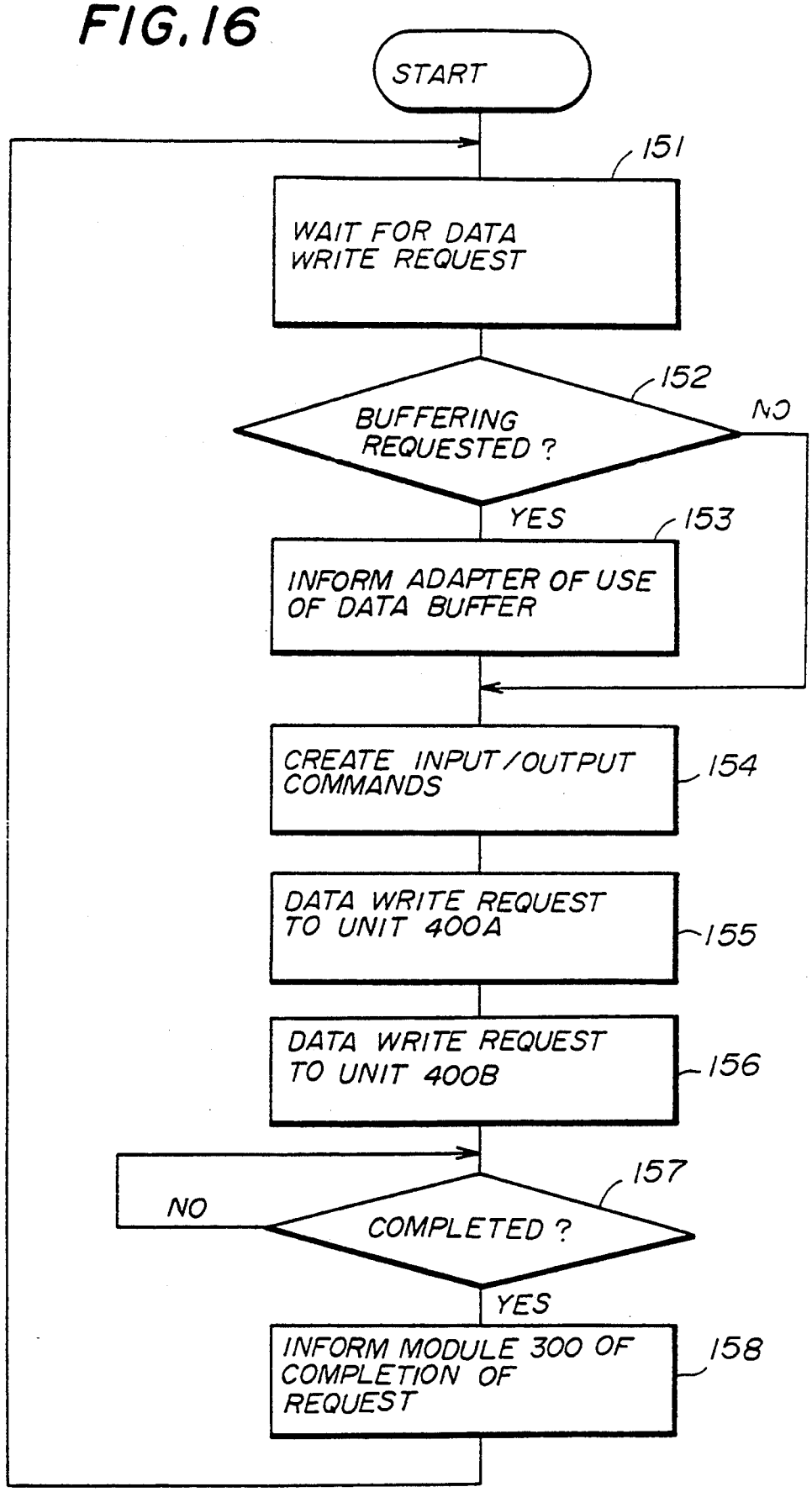
FIG. 16 is a flowchart of a procedure executed by a central processing unit of a processor module shown in FIG. 5.

FIG. 16 is a flowchart of the procedure executed by the CPU 11 and the MPU 23 shown in FIG. 5. At step 151 shown in FIG. 15, the CPU 11 receives a request to write data stored in the MSU 20 into the magnetic disc devices 220A and 220B. At step 152, the CPU 11 determines which one of the modes should be used. When the mode without using the data buffers 420A and 420B, is requested, the CPU 11 executes step 154. On the other hand, when the mode shown in FIG. 6 or FIGS. 7A and 7B is requested, the CPU 11 executes step 153 at which step the CPU 11 informs the input/output adapters 420A and 420B (more specifically, the MPU 23) of the occurrence of the request using the data buffers. Then, the CPU 11 creates the aforementioned input/output commands at step 154. Then, the CPU 11 sequentially sends the input/output commands the input/output adapters 410A and 410B at steps 155 and 156. At step 157, the CPU 11 determines whether or not the write completion responses have been respectively received from the input/output adapters 410A and 410B (in the case shown in FIG. 4A). As has been described previously, there are two determination methods shown in FIGS. 4A and 4B. In the case of FIG. 4B, the CPU 11 determines whether or not the write completion response has been received from one of the input/output adapters 410A and 410B in addition to the determination used in the case shown in FIG. 4A. When the result at step 157 is YES, the processor module 300 recognizes that the requested data write operation has been completely executed.

Figure 17:
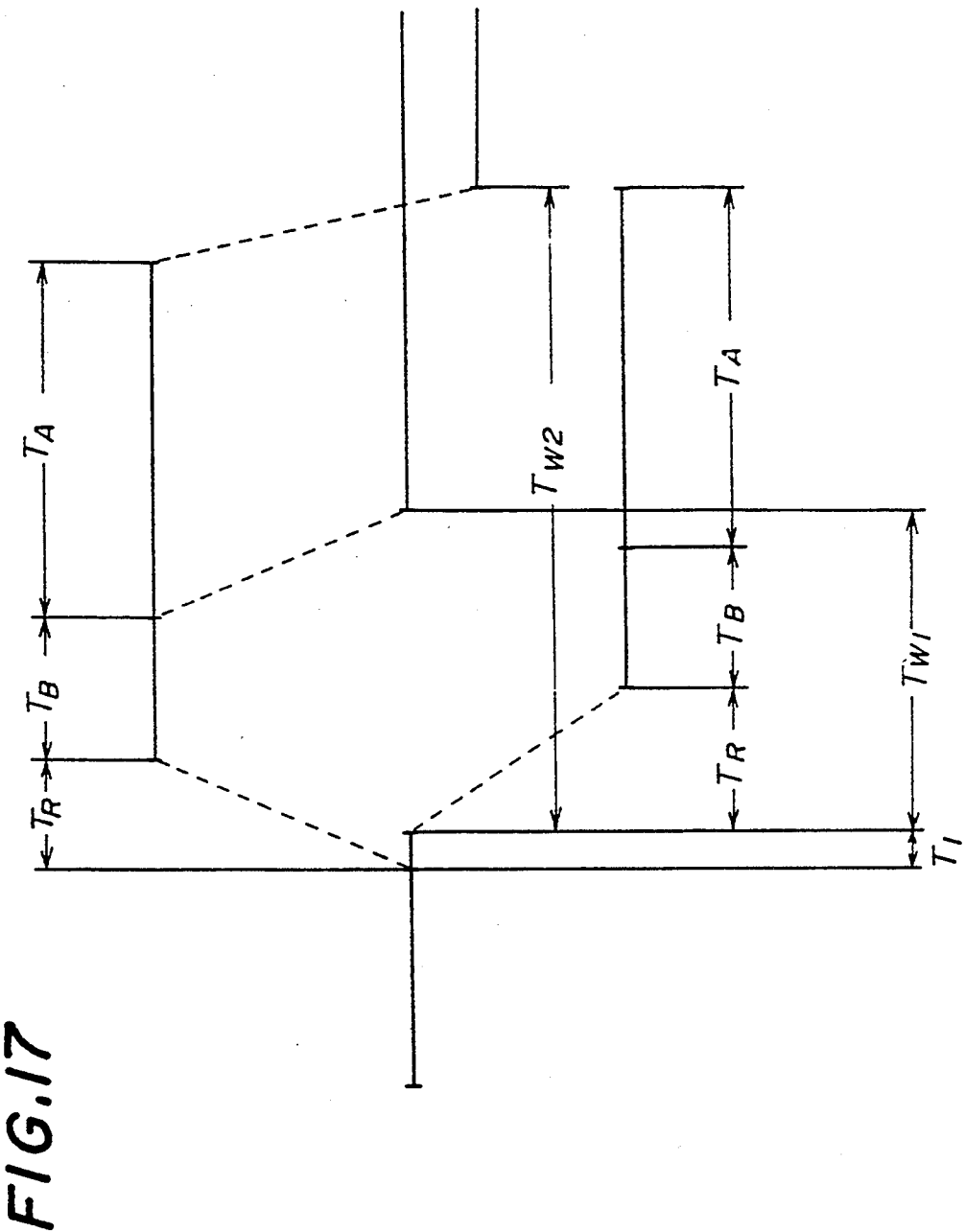
FIG. 17 is a time chart showing the procedure shown in FIG. 16.

FIG. 17 is a time chart illustrating the operation when the procedure shown in FIG. 4A is employed. In FIG. 17, $T_R$ denotes a time lag between the first issue of the input/output commands and the time when the corresponding input/output adapter 410A or 410B starts to operate. $T_B$ denotes the time it takes to read out data from the MSU 20 and write it into the data buffer 420A or 420B. $T_A$ denotes the time necessary to transfer data from the data buffer 420A or 420B to the magnetic disc device 220A or 220B. $T_I$ denotes the time lag between the first issue of the input/output commands addressed to the input/output adapter 410A and the second issue of the input/output commands addressed to the input/output adapter 410B. $T_{W1}$ denotes the time it takes to complete the data write operation of the data buffer 420A, and $T_2$ denotes the time it takes to complete the data write operation of the data buffer 420B.

The present invention is not limited to the specifically disclosed embodiments, and variations and modifications may be made without departing from the scope of the present invention.

What is claimed is:

1. A method of controlling a duplex data storage system having two data storage units, each having a data storage device, said method comprising the steps of:

sending to each of said two data storage units, from a processor module coupled to said two data storage units, a data write request to write data in each of said two data storage units;

sending, from said processor module, data specified by said data write request to each of said two data storage units;

writing said data in data buffers respectively provided in said two data storage units;

sending, from each of said two data storage units, a write completion response to said processor module when said data has been completely written into each of said data buffers;

writing said data stored in said data buffers into said two data storage devices; and determining whether or not said write completion response from each of said two data storage units has been received, and said processor module recognizing that said data write request has been completed when it is determined that said write completion responses from each of said two data storage units has been received.

2. A method as claimed in claim 1, wherein the step of sending said data write request comprises the step of successively sending said data write request to said two data storage units at different times.

3. A method as claimed in claim 1, wherein the step of sending the data specified by said data write request comprises the step of sending first data to a first one of said two data storage units and then sending second data identical to said first data to a second one of said two data storage units.

4. A method of controlling a duplex data storage system having two data storage units, each having a data storage device, said method comprising the steps of:

sending to each of said two data storage units from a processor module coupled to said two data storage units, a data write request to write data in each of said two data storage units;

sending, from said processor module, data specified by said data write request to each of said two data storage units;

writing said data in data buffers respectively provided in said two data storage units;

sending, from each of said two data storage units, a first write completion response to said processor module when said data has been completely written into each of said data buffers;

writing said data stored in said data buffers into said two data storage devices; and sending, from each of said two data storage units, a second write completion response to said processor module when said data has been completely written into each of said two data storage devices; and determining whether or not said first write completion response from each of said two data storage units and said second write completion response from one of said data storage units have been received, and said processor module recognizing that said data write request has been completed when it is determined that said first write completion response from each of said two data storage units and said second write completion response from one of said data storage units have been received.

5. A method as claimed in claim 3, wherein the step of sending said data write request comprises the step of successively sending said data write request to said two data storage units at different times.

6. A method as claimed in claim 4, wherein the step of sending the data specified by said data write request comprises the step of sending first data to a first one of said two data storage units and then sending second data identical to said first data to a second one of said two data storage units.

7. A data processing system, comprising:

a processor module; and a duplex data storage system connected to said processor module and having a first data storage unit and a second data storage unit, each of said first and second data storage units comprising:

a data buffer storing data specified by a data write request generated by said processor module and sent from said processor module;

a data storage device storing said data supplied from said data buffer and said processor module;

control means for reading said data out of said data storage device and for writing said data into said data storage device; and determining means for determining whether said data has been completely written into said data buffer and for sending a write completion response to said processor module when it is determined that said data has been completely written into said data buffer, and said processor module comprising means for determining whether said write completion response from each of said first and second data storage units has been received, and said processor module recognizing that said data write request has been completed when it is determined that said write completion responses from each of said first and second data storage units has been received.

8. A data processing system, comprising:

a processor module; and a duplex data storage system having a first data storage unit and a second data storage unit, each of said first and second data storage units comprises:

a data buffer storing data specified by a data write request generated by said processor module and sent from said processor module;

a data storage device storing said data supplied from said data buffer;

control means for reading out said data from said data storage device and for writing said data into said data storage device;

first determining means for determining whether said data has been completely written into said data buffer and for sending a first write completion response to said processor module when it is determined that said data has been completely written into said data buffer; and second determining means for determining whether said data read out from said data buffer has been completely written into said data storage device and for sending a second write completion response to said processor module when it is determined that said data has been completely written into said data storage device, and said processor module comprises means for determining whether said first write completion response from each of said first and second data storage units and said second write complete message from one of said first and second data storage units have been received, and said processor module recognizing that said data write request has been completed when it is determined that said first write completion response from each of said first and second data storage units and said second write complete message from one of said first and second data storage units have been received.

9. A method of performing duplex data storage, comprising:

requesting duplex data storage by a processor of data to be stored;

writing by a first unit storage controller of the data into a first buffer of a first storage system and providing a first buffer write completion indication when the writing is complete;

writing by a second storage unit controller of the data into a second buffer of a second buffer storage system and providing a second write completion indication when the writing is complete; and writing by the first storage unit controller of the data into a first storage unit from the first buffer and writing by the second storage unit for the data into a second storage unit from the second buffer; further comprising the step of determining, by a processor storage controller, that the duplex storage request is complete when the first and second buffer write completion indications are provided.

10. A method as recited in claim 9, further comprising:

producing, by the first and second storage unit controllers respectively, first and second storage unit write completion indications when the writing into the first and second storage units is completed; and determining, by a processor storage controller, that the duplex storage request is complete when one of the first and second storage unit write completion indications are produced.

11. A duplex data storage system, comprising:

means for processing a duplex storage request;

a first storage device coupled to said means for processing and including a first buffer, a first storage unit, and first means for indicating when writing into said first buffer is completed and when writing into said first storage unit is completed;

a second storage device coupled to said means for processing and including a second buffer, a second storage unit, and second means for indicating when writing into said second buffer is completed and when writing into said second storage unit is completed; and completion means for indicating when said duplex storage request is complete responsive to said first and second means.

12. A system as recited in claim 11, wherein said completion means indicates completion when said first means indicates writing into said first buffer is complete and said second means indicates writing into said second buffer is complete.

13. A system as recited in claim 12, wherein said completion means indicates completion when one of said first and second means indicates writing into one of said first and second storage units is complete.

* * * * *

UNITED STATES PATENT AND TRADEMARK OFFICE
CERTIFICATE OF CORRECTION

PATENT NO. : 5,377,342
DATED : December 27, 1994
INVENTOR(S) : Sakai et al.

It is certified that error appears in the above-indentified patent and that said Letters Patent is hereby corrected as shown below:

Title Page, column 1, ITEM: [56] References Cited,
   line 2, "4,916;605" should be --4,916,605--.
Column 6, line 38, after "ence" insert --,--.
Column 8, line 16, after "50" insert --,--.
Column 9, line 29, delete "the".
Column 9, line 30, after "and" insert --the--.
   Column 10, line 7, "Next" should be --next--.
Column 12, line 67, "$T_2$" should be --$T_{w2}$--.

Signed and Sealed this

Sixteenth Day of May, 1995

Attest:

BRUCE LEHMAN

Attesting Officer    Commissioner of Patents and Trademarks